United States Patent [19]

Kano et al.

[11] Patent Number: 5,725,642
[45] Date of Patent: Mar. 10, 1998

[54] SOLID PAINTING MATERIAL

[75] Inventors: Yoshimi Kano; Koji Seki, both of Kuki, Japan

[73] Assignees: Buncho Corporation, Tokyo; Kotobuki & Co., Ltd., Kyoto, both of Japan

[21] Appl. No.: 635,380

[22] Filed: Apr. 19, 1996

[30] Foreign Application Priority Data

May 9, 1995 [JP] Japan ................................ 7-110411

[51] Int. Cl.$^6$ ................................................ C09D 13/00
[52] U.S. Cl. ................................ 106/31.07; 106/31.01
[58] Field of Search ........................ 106/19 B, 19 A, 106/27 R, 31.01, 31.07

[56] References Cited

U.S. PATENT DOCUMENTS

| | | | |
|---|---|---|---|
| 3,360,489 | 12/1967 | Grossman et al. | 106/19 B |
| 5,236,494 | 8/1993 | Kano | 106/19 R |
| 5,261,952 | 11/1993 | Craig | 106/19 B |
| 5,336,307 | 8/1994 | Horvat et al. | 106/19 B |
| 5,587,408 | 12/1996 | Burns et al. | 106/19 B |

FOREIGN PATENT DOCUMENTS

| | | |
|---|---|---|
| 1-217090 | 8/1989 | Japan. |
| 5-311107 | 11/1993 | Japan. |
| 6-33010 | 2/1994 | Japan. |
| 6-145582 | 5/1994 | Japan. |
| 8-12917 | 1/1996 | Japan. |

*Primary Examiner*—Helene Klemanski
*Attorney, Agent, or Firm*—Oblon, Spivak, McClelland, Maier & Neustadt, P.C.

[57] ABSTRACT

A solid painting material comprises an aliphatic carboxylic acid salt having 8 to 36 carbon atoms as a gel-forming substance, 1 to 40% by weight of a coloring agent, a nonionic surfactant and 0 to 40% by weight of water. The painting material may further comprise a glycolic solvent or may substantially free of water. The painting material can prevent, to the utmost, the deterioration of the quality, while maintaining its painting and fixing properties and softness of a gel as a constituent thereof.

17 Claims, No Drawings

SOLID PAINTING MATERIAL

BACKGROUND OF THE INVENTION

The present invention relates to a solid painting material and more particularly to a solid painting material which is excellent in, in particular, painting and fixing properties, which can ensure good painting properties even when repeatedly coated with the material and which can also be used as a fluorescent marker.

There have been developed a variety of solid painting materials each of which comprises an aliphatic carboxylic acid salt having 8 to 36 carbon atoms as a gel-forming substance and a coloring agent. For instance, Japanese Un-Examined Patent Publication (hereinafter referred to as "J. P. KOKAI") No. Hei 1-217090 discloses a solid painting material comprising an aliphatic carboxylic acid salt having 8 to 36 carbon atoms as a gel-forming substance, at most 70% by weight of a coloring agent such as titanium oxide, a thixotropic agent and a lubricant such as organic bentonite, and a water repellant such as a wax and also discloses that this solid painting material may be used as, for instance, a retouching agent and a fluorescent marker. Moreover, J. P. KOKAI No. Hei 4-337372 discloses a solid painting material comprising hydrophobic silica in addition to an aliphatic carboxylic acid salt as a gel-forming substance and a coloring agent or J. P. KOKAI No. Hei 5-311107 discloses a solid painting material comprising powdery cellulose in addition to an aliphatic carboxylic acid salt as a gel-forming substance and a coloring agent.

These solid painting materials are advantageous in that they can be dried and fixed immediately after writing on paper therewith and they do not make the surrounding area of a written image dirty when the image is rubbed since they comprise a large amount of water as a solvent. On the other hand, they suffer from problems in that, if failing to cap the solid painting materials, the painting materials per se are dried and correspondingly lose the initial smooth writing quality thereof and that the solid painting materials become thin through contraction and come out from the holders.

It is difficult to solve these problems even if the holder accommodating each solid painting material is always capped after using the same. This is because if the cap-off time during using them is relatively long and they are repeatedly kept in such a cap-off state, the solid painting materials are gradually dried due to evaporation of the moisture therefrom. Moreover, if the air tightness between the cap and the holder is incomplete because of malfunction of the parts and a mistake in the assemblage thereof, the service time of the solid painting material is substantially reduced.

On the other hand, it has been known that a glycol solvent is added to a water-based ink in order to prevent drying thereof and such an idea would also be effective, to some extent, for the solid painting materials. However, if a part of the moisture present in the solid painting material is gradually replaced with a glycol solvent, the gel forming the painting material becomes hard and simultaneously brittle and the solid painting material having such a composition suffers from a problem such that waste of the painting material is formed in a large amount during writing therewith.

SUMMARY OF THE INVENTION

Accordingly, it is an object of the present invention to provide a solid painting material which can prevent, to the utmost, the quality deterioration of the painting material due to drying of the same, while maintaining its painting and fixing properties and softness of a gel as an ingredient thereof.

The present invention has been developed on the basis of such a finding that the foregoing problems associated with the conventional solid painting materials can effectively be solved by reducing the amount of water to be used and using a nonionic surfactant when preparing a solid painting material.

According to the present invention, there is thus provided a solid painting material comprising an aliphatic carboxylic acid salt having 8 to 36 carbon atoms as a gel-forming substance, 1 to 40% by weight of a coloring agent, a nonionic surfactant and 0 to 40% by weight of water.

DESCRIPTION OF THE PREFERRED EMBODIMENTS

The solid painting material of the present invention will hereinafter be described in more detail with reference to various embodiments.

The aliphatic carboxylic acid salts having 8 to 36 carbon atoms used in the present invention as the gel-forming substances are preferably alkali metal salts and/or ammonium salts of branched or unbranched aliphatic carboxylic acids having 8 to 36 carbon atoms, with aliphatic carboxylic acid salts having 12 to 18 carbon atoms being particularly preferred. Specific examples of aliphatic carboxylic acids which constitute the aliphatic carboxylic acid salts are caprylic acid, pelargonic acid, capric acid, undecanoic acid, lauric acid, myristic acid, palmitic acid, stearic acid, arachic acid, behenic acid, lignoceric acid, cerotic acid, montanic acid and melissic acid.

Examples of alkali metal salts of aliphatic carboxylic acids are lithium, sodium and potassium salts, with sodium myristate, sodium palmitate, sodium stearate or mixture thereof being particularly preferred.

The amount of the aliphatic carboxylic acid salt to be used ranges from 5 to 30% by weight and preferably 8 to 22% by weight based on the total weight of the solid painting material of the invention. This is because the use of the salt in an amount less than 5% by weight makes it difficult to solidify the resulting painting material and interferes with the formation of a gel, while the use thereof in an amount of more than 30% by weight has a tendency of inhibiting the functions of bodying components and thixotropic agents and impairs the coating properties of the painting material.

The coloring agent used in the invention is not restricted to particular ones and may, if necessary, be selected from the group consisting of known pigments or dyes. In addition, fluorescent dyes may likewise be used in the invention. Examples of coloring agents usable herein are inorganic pigments such as black iron oxide, yellow iron oxide, red iron oxide, ultramarine blue, iron blue, alumina white, carbon black, aluminum powder, bronze powder and mica; or organic pigments, for instance, nitroso or nitro dyes such as Naphthol Green and Naphthol Yellow, azo lake pigments such as Lithol Red, Lake Red C, Brilliant Carmine 6B, Watching Red and Bordeaux 10B, insoluble azo pigments such as Fast Yellow, Dis-azo Yellow, Pyrazolone Orange, Para Red, Lake Red 4R and Naphthol Red, condensed azo pigments such as Chrome Phthal Yellow and Chrome Phthal Red, dyeing lake pigments such as Peacock Blue Lake, Alkali Blue Lake, Rhodamine Lake, Methyl Violet Lake and Malachite Green Lake, phthalocyanine pigments such as Phthalocyanine Blue, Fast Sky Blue and Phthalocyanine Green, vat pigments such as Anthrapyrimidine Yellow, Perynone Orange, Perylene Red, Thioindigo Red and Indanthrone Blue, quinaeridone pigments such as Quinacridone Red and Quinacridone Violet, dioxazine pigments such as Dioxazine Violet, isoindolinone pigments such as Isoindolinone Yellow, and fluorescent pigments. In addition, examples of white pigments are titanium oxide, zinc oxide, white lead, zinc sulfide, antimony oxide, alumina white, satin white and barium sulfate, with titanium oxide being particularly preferred.

The foregoing coloring agents may be used alone or in any combination.

The coloring agent is used in the solid painting material of the invention in an amount ranging from 1 to 40% by weight, preferably 1 to 15% by weight and more preferably 2 to 10% by weight based on the weight of the painting material.

A variety of nonionic surfactants may be used in the invention. Specific examples thereof are polyethylene glycol type nonionic surfactants such as polyoxyethylene alkyl ethers and phosphoric acid esters thereof, polyoxyethylene alkylphenyl ethers, adducts of fatty acids with ethylene oxide, adducts of polyhydric alcohol fatty acid esters and ethylene oxide (for instance, Tween), alkylamine-ethylene oxide adducts, fatty acid amide-ethylene oxide adduces, polyoxyethylene polypropylene glycol, and fat and oil-ethylene oxide adducts; and polyhydric alcohol type nonionic surfactants such as fatty acid esters of glycerin, sorbitan fatty acid esters (for instance, Span) and sucrose fatty acid esters. Among these nonionic surfactants, preferred are those having an HLB value ranging from 6 to 18. Specific examples of such preferred nonionic surfactants include polyoxyethylene alkyl ethers and phosphoric acid esters thereof, polyoxyethylene alkylphenyl ether including polyoxyethylene styrene phenyl ether, polyoxyethylene polypropylene glycol, polyoxyethylene hardened castor oil and sorbitan monoalkyl esters.

In the present invention, the content of the nonionic surfactant in the painting material may be arbitrarily be selected, but preferably ranges from 0.5 to 50% by weight on the basis of the total weight of the solid painting material.

The painting material of the invention comprises the foregoing compounds as essential components and has a content of water ranging from 0 to 40% by weight and preferably 20 to 38% by weight based on the total weight of the painting material.

Preferably, the painting material of the invention also comprises a glycolic solvent in addition to the foregoing components. Glycolic solvents usable in the present invention may be compounds each having not less than two alcoholic hydroxyl groups in the molecule such as glycerin, ethylene glycol, propylene glycol and diethylene glycol. Among them, preferred are glycols having 2 to 6 carbon atoms, in particular, glycols having 2 to 4 carbon atoms. These glycolic solvents except for glycerin cause discoloration of thermosensitive recording paper and accordingly, glycerin is preferably used as the glycolic solvent when the resulting solid painting material is used as an underline marker. The glycolic solvent is used in the painting material in an amount ranging from 2 to 45% by weight and preferably 15 to 40% by weight based on the total weight of the painting material.

According to particularly preferred embodiments of the present invention, the solid painting material has the following composition:

EMBODIMENT 1

A solid painting material comprising an aliphatic carboxylic acid salt having 8 to 36 carbon atoms as a gel-forming substance, 1 to 40% by weight of a coloring agent, a nonionic surfactant, a glycolic solvent and 20 to 38% by weight of water. In this respect, the painting material preferably comprises, based on the total weight of the material, 0.5 to 15% by weight of a nonionic surfactant and 20 to 40% by weight of a glycolic solvent.

EMBODIMENT 2

A solid painting material comprising an aliphatic carboxylic acid salt having 8 to 36 carbon atoms as a gel-forming substance, 1 to 40% by weight of a coloring agent, a nonionic surfactant and 20 to 38% by weight of water, which is substantially free of a glycolic solvent. In this respect, the painting material preferably comprises, based on the total weight of the material, 22 to 50% by weight of a nonionic surfactant.

EMBODIMENT 3

A solid painting material comprising an aliphatic carboxylic acid salt having 8 to 36 carbon atoms as a gel-forming substance, 1 to 40% by weight of a coloring agent, a nonionic surfactant and a glycolic solvent, which is substantially free of water. In this respect, the painting material preferably comprises, based on the total weight of the material, 25 to 40% by weight of a nonionic surfactant and 20 to 40% by weight of a glycolic solvent.

In addition to the foregoing compounds, the solid painting material of the present invention may further comprise other various components. For instance, when the painting material comprises water, it preferably comprises about 0.005 to 0.1% by weight of a preservative or an antifungal agent. In addition, the material may comprise bodying components such as silica, clay, talc and calcium carbonate for the purpose of thickening the painting material and/or the improvement of the resulting stick in the strength and writing properties. The silica used in the invention is in the form of fine particles having a particle size falling within the range of from 0.02 to 15 mμ and a specific surface area ranging from 1 to 700 m$^2$/g. In this connection, the surface of silica particles may be converted, in advance, into hydrophobic one to give hydrophobic silica particles. Such hydrophobic silica may be commercially available from various manufacturers such as Tokuyama Soda Co., Ltd. (Leosil MT-10), Nippon Silica Industry Co., Ltd. (Nipsil SS Hydrophobic Silica), and Nippon Aerosil Co., Ltd. (Aerosil R-972). On the other hand, hydrophilic silica particles have also been known and can be commercially available from, for instance, Tokuyama Soda Co., Ltd. (Tokusil), Bayer (Silicasil), Micron Co., Ltd. (Harimic), Nippon Aerosil Co., Ltd. (Aerosil Elsil), Nippon Silica Industry Co., Ltd. (Nipsil), Fuji Devison Chemical Co., Ltd. (Cyroid) and Elle Chem Co., Ltd. (Microsilica). In the present invention, silica is incorporated into the painting material in an amount ranging from 1 to 20% by weight and preferably 3 to 10% by weight based on the total weight of the material.

Moreover, the painting material of the invention may, if necessary comprise a thixotropic agent such as organic and inorganic bentonites and natural and synthetic smectites. The amount of the thixotropic agent to be used ranges from 0 to 5% by weight and preferably 1 to 4% by weight on the basis of the weight of the solid painting material. This is because the use of the thixotropic agent in an amount of more than 5% by weight results in an increase in the viscosity of the resulting painting material and this accordingly interferes with the .production thereof. The painting material may likewise comprise, if necessary, a lubricant, for instance, a metal salt of a fatty acid such as aluminum stearate and zinc laurate and the amount thereof to be added thereto ranges from 0.1 to 1% by weight based on the total weight of the painting material. The lubricant is added to the painting material of the invention in order to enhance the thixotropic and coating properties of thereof.

The solid painting material of the present invention may be prepared by dissolving an aliphatic carboxylic acid salt and a nonionic surfactant in a desired amount of water and/or a glycolic solvent while heating the mixture under reflux at 90° C. with stirring, followed by adding a coloring agent, a bodying component or the like which have been, in advance, dispersed in water and/or a glycolic solvent, stirring the resulting mixture and then injecting the resulting solid painting material into a container for extrusion and solidifying the mixture through cooling or extrusion molding into a rod-like product and finally inserted into a closed container provided with a cap.

As has been discussed above in detail, the present invention permits the production of a solid painting material which can prevent, to the utmost, the deterioration of the quality thereof, while maintaining its painting and fixing properties and softness of a gel as an ingredient thereof.

The present invention will hereinafter be described in more detail with reference to the following working Examples, but the present invention is not restricted to these specific Examples at all.

EXAMPLE 1

A solid painting material according to the present invention was prepared from the following formulation.

| Component | Amount (part by weight) |
|---|---|
| A-1 | |
| glycerin | 23 |
| triazine (preservative) | 0.01 |
| sodium stearate | 18 |
| polyoxyethylene styrene phenol ether (HLB 12.8) | 10 |

The foregoing ingredients were dissolved with slowly stirring at 90° C. for 3 hours to give a uniform gel base A-1. This gel base A-1 was a transparent and viscous liquid immediately after the completion of the dissolution, but formed a wax-like hard gel when cooled down to a temperature of not more than 60° C.

Separately, the following materials were ground and dispersed using a sand mill to give a color base B-1. This color base B-1 was a uniform liquid immediately after the dispersion, but C. I. Pigment Yellow 3 underwent precipitation when allowing the color base to stand for several days.

| Component | Amount (part by weight) |
|---|---|
| B-1 | |
| water | 20 |
| glycerin | 11 |
| Tiabendazole (antifungal agent) | 0.01 |
| C.I. Pigment Yellow 3 | 5 |

Then the gel base A-1 and the color base B-1 were combined and mixed in a mortar to give a paste-like product and further mixed sufficiently using a three-roll mill.

The resulting product was introduced into a closed container, followed by allowing the container to stand in a thermostatic chamber maintained at 90° C. for 2 hours to thus dissolve the product and then injecting the dissolved product into a mold maintained at 25° C. After about one minute at which the material was completely solidified, the material formed was removed from the mold to thus give a rod-like painting material having a diameter of 8 mm and a length of 60 mm. This rod-like painting material is accommodated in a delivery holder capable of closing with a cap prior to practical use.

EXAMPLE 2

Another solid painting material (rod-like painting material) of the present invention was produced by repeating the same procedures used in Example 1 except for using a gel base A-2 and a color base B-2 having the following compositions, respectively.

| Component | Amount (part by weight) |
|---|---|
| A-2 | |
| water | 12 |
| glycerin | 15 |
| triazine | 0.01 |
| sodium stearate | 18 |
| polyoxyethylene styrene phenol ether (HLB 12.8) | 4 |
| B-2 | |
| water | 20 |
| glycerin | 11 |
| Tiabendazole | 0.01 |
| C.I. Pigment Yellow 3 | 5 |

(The gel base A-2 was dissolved under reflux using a flask equipped with a condenser).

EXAMPLE 3

A solid painting material (rod-like painting material) of the present invention was produced by repeating the same procedures used in Example 1 except for using a gel base A-3 and a color base B-3 having the following compositions, respectively.

| Component | Amount (part by weight) |
|---|---|
| A-3 | |
| water | 15 |
| glycerin | 18 |
| triazine | 0.01 |
| sodium stearate | 18 |
| polyoxyethylene styrene phenol ether (HLB 12.8) | 4 |
| B-3 | |
| water | 20 |
| glycerin | 8 |
| Tiabendazole | 0.01 |
| silica | 6 |
| bentonite | 1 |
| C.I. Pigment Yellow 3 | 5 |

The color base B-3 was in a sol state immediately after the dispersion, but converted into a gel state after about several hours to one day.

EXAMPLE 4

A solid painting material (rod-like painting material) of the present invention was produced by repeating the same procedures used in Example 1 except for using a gel base A-4 and a color base B-4 having the following compositions, respectively.

| Component | Amount (part by weight) |
|---|---|
| A-4 | |
| water | 2.5 |
| glycerin | 26 |
| triazine | 0.01 |
| sodium stearate | 18 |
| polyoxyethylene hardened castor oil (HLB 12.5) | 4 |
| B-4 | |
| water | 30 |
| Tiabendazole | 0.01 |
| silica | 6 |
| C.I. Pigment Yellow 3 | 5 |

EXAMPLE 5

A solid painting material (rod-like painting material) of the present invention was produced by repeating the same procedures used in Example 1 except for using a gel base A-5 and a color base B-5 having the following compositions, respectively.

| Component | Amount (part by weight) |
|---|---|
| A-5 | |
| water | 2.5 |
| diethylene glycol | 26 |
| triazine | 0.01 |
| sodium stearate | 18 |
| sorbitan monolaurate (HLB 8.6) | 4 |
| B-5 | |
| water | 30 |
| Tiabendazole | 0.01 |
| silica | 6 |
| C.I. Pigment Yellow 3 | 5 |

EXAMPLE 6

A solid painting material (rod-like painting material) of the present invention was produced by repeating the same procedures used in Example 5 except for substituting phosphoric acid ester of polyoxyethylene alkyl ether (HLB 13.3) for the sorbitan monolaurate used in Example 5.

EXAMPLE 7

A solid painting material (rod-like painting material) of the present invention was produced by repeating the same procedures used in Example 5 except for substituting polyoxyethylene higher alcohol ether (HLB 10.5) for the sorbitan monolaurate used in Example 5 and substituting propylene glycol for the diethylene glycol used in Example 5.

EXAMPLE 8

A solid painting material (rod-like painting material) of the present invention was produced by repeating the same procedures used in Example 1 except for using a gel base A-8 and a color base B-8 having the following compositions, respectively.

| Component | Amount (part by weight) |
|---|---|
| A-8 | |
| water | 2.5 |
| glycerin | 26 |
| triazine | 0.01 |
| sodium stearate | 18 |
| polyoxyethylene lauryl ether (HLB 9.7) | 4 |
| B-8 | |
| water | 24.5 |
| glycerin | 11 |
| Tiabendazole | 0.01 |
| silica | 6 |
| C.I. Pigment Yellow 3 | 5 |

EXAMPLE 9

A solid painting material (rod-like painting material) of the present invention was produced by repeating the same procedures used in Example 1 except for using a gel base A-9 and a color base B-9 having the following compositions, respectively.

| Component | Amount (part by weight) |
|---|---|
| A-9 | |
| water | 2.5 |
| glycerin | 26 |
| triazine | 0.01 |
| sodium stearate | 18 |
| polyoxyethylene nonylphenyl ether (HLB 9.2) | 5 |
| B-9 | |
| water | 24.5 |
| Tiabendazole | 0.01 |
| silica | 6 |
| C.I. Pigment Yellow 3 | 5 |

EXAMPLE 10

A solid painting material (rod-like painting material) of the present invention was produced by repeating the same procedures used in Example 1 except for using a gel base A-10 and a color base B-10 having the following compositions, respectively.

| Component | Amount (part by weight) |
|---|---|
| A-10 | |
| water | 8 |
| glycerin | 26 |
| triazine | 0.01 |
| sodium stearate | 18 |
| polyoxyethylene nonylphenyl ether (HLB 9.2) | 4 |
| B-10 | |
| water | 20 |
| glycerin | 8 |
| Tiabendazole | 0.01 |
| silica | 6 |
| C.I. Pigment Yellow 3 | 5 |

EXAMPLE 11

A solid painting material (rod-like painting material) of the present invention was produced by repeating the same procedures used in Example 10 except that the amount of the polyoxyethylene nonylphenyl ether used in Example 10 was changed from 4 parts by weight to one part by weight.

EXAMPLE 12

A solid painting material (rod-like painting material) of the present invention was produced by repeating the same procedures used in Example 1 except for using a gel base A-12 and a color base B-12 having the following compositions, respectively.

| Component | Amount (part by weight) |
|---|---|
| A-12 | |
| water | 14 |
| glycerin | 26 |
| triazine | 0.01 |
| sodium stearate | 18 |
| polyoxyethylene glycerol borate . oleate (HLB 17.2) | 4 |
| B-12 | |
| water | 20 |
| glycerin | 2 |
| Tiabendazole | 0.01 |
| silica | 6 |
| C.I. Pigment Yellow 3 | 5 |

EXAMPLE 13

A solid painting material (rod-like painting material) of the present invention was produced by repeating the same procedures used in Example 1 except for using a gel base A-13 and a color base B-13 having the following compositions, respectively.

| Component | Amount (part by weight) |
|---|---|
| A-13 | |
| water | 14 |
| glycerin | 20 |
| triazine | 0.01 |
| sodium stearate | 18 |
| polyoxyethylene nonylphenyl ether (HLB 9.2) | 4 |
| B-13 | |
| water | 22 |
| glycerin | 11 |
| Tiabendazole | 0.01 |
| silica | 7 |
| fluorescent pigment | 5 |

The painting material of this Example can be used as an underline marker.

EXAMPLE 14

A solid painting material (rod-like painting material) of the present invention was produced by repeating the same procedures used in Example 1 except for using a gel base A-14 and a color base B-14 having the following compositions, respectively.

| Component | Amount (part by weight) |
|---|---|
| A-14 | |
| glycerin | 12 |
| triazine | 0.01 |
| sodium stearate | 18 |
| polyoxyethylene nonylphenyl ether (HLB 9.2) | 24 |
| B-14 | |
| polyoxyethylene nonylphenyl ether | 20 |
| glycerin | 8 |
| Tiabendazole | 0.01 |
| silica | 5 |
| C.I. Pigment Yellow 3 | 5 |

The solid painting material prepared in this Example is free of any moisture except for that naturally absorbed by each ingredient. For this reason, any sealing performance is not required for the holder for accommodating the painting material of this type. However, marks drawn on paper therewith were not dried, like those drawn with crayons and oil pastels.

The composition exhibited excellent flow characteristics when it was in a molten state of not less than 60° C. and accordingly, the ingredients could spontaneously be poured into a mold without applying any compulsory force.

Comparative Example 1

A comparative solid painting material (rod-like painting material) was produced by repeating the same procedures used in Example 1 except for using a gel base A-Comp. 1 and a color base B-Comp. 1 having the following compositions, respectively.

| Component | Amount (part by weight) |
|---|---|
| A-Comp. 1 | |
| water | 28 |
| glycerin | 5 |
| triazine | 0.01 |
| sodium stearate | 18 |
| B-Comp. 1 | |
| water | 19 |
| glycerin | 8 |
| Tiabendazole | 0.01 |
| silica | 6 |
| C.I. Pigment Yellow 3 | 5 |

The solid painting material produced in this Comparative Example comprised water in an amount corresponding to about a half of the composition and accordingly, the painting material underwent an weight loss of not less than 40% by weight after 24 hours when it was allowed to stand under an exposed condition.

Comparative Example 2

Another comparative solid painting material (rod-like painting material) was produced by repeating the same procedures used in Example 1 except for using a gel base A-Comp. 2 and a color base B-Comp. 2 having the following compositions, respectively.

| Component | Amount (part by weight) |
|---|---|
| A-Comp. 2 | |
| water | 8 |
| glycerin | 26 |
| triazine | 0.01 |
| sodium stearate | 18 |
| B-Comp. 2 | |
| water | 20 |
| glycerin | 8 |
| Tiabendazole | 0.01 |
| silica | 6 |
| C.I. Pigment Yellow 3 | 5 |

The solid painting material produced in this Comparative Example was completely free of any nonionic surfactant. The painting material underwent an weight loss, observed after 24 hours, on the order of about 21% by weight when it was allowed to stand under an exposed condition, like the most of the materials of the foregoing Examples, but it gave an impression of hard writing feeling and formed a large amount of fine waste of the painting material during painting operations.

EXAMPLE 15

A solid painting material (rod-like painting material) of the present invention was produced by repeating the same procedures used in Example 1 except for using a gel base A-15 and a color base B-15 having the following compositions, respectively.

| Component | Amount (part by weight) |
|---|---|
| A-15 | |
| sodium stearate | 18 |
| polyoxyethylene nonylphenyl ether (HLB 7.8) | 40 |
| triazine | 0.01 |
| B-15 | |
| water | 28 |
| Tiabendazole | 0.01 |
| silica | 6 |
| C.I. Pigment Blue 15 | 3 |

The gel constituting the solid painting material prepared in this Example is soft and the material permits drawing of dense and deep images and lines on paper. Although the painting material contains water, but a large amount of liquid polyoxyethylene nonylphenyl ether is also included. Therefore, drawn marks are not hardened even after the evaporation of the water. It is desirable that a commercially available fixing agent be sprayed on the surface of paper when the paper is repeatedly painted or for the purpose of storage of a completed picture, like in Example 14.

EXAMPLE 16

A solid painting material (rod-like painting material) of the present invention was produced by repeating the same procedures used in Example 1 except for using a gel base A-16 and a color base B-16 having the following compositions, respectively.

| Component | Amount (part by weight) |
|---|---|
| A-16 | |
| water | 14 |
| glycerin | 20 |
| sodium stearate | 18 |
| polyoxyethylene polypropylene glycol (molecular weight of the polypropylene glycol: about 2000; that of polyoxyethylene: about 1300) | 8 |
| B-16 | |
| water | 20 |
| glycerin | 8 |
| hectorite | 1 |
| silica | 4 |
| Pearl Pigment White | 10 |

The solid painting material prepared in this Example was a transparent stick having a bright pearl color.

The following Table 1 shows characteristic properties of the solid painting materials prepared in Examples 1 to 16 and Comparative Examples 1 and 2 together with the contents (% by weight) of water, glycols and surfactants used.

TABLE 1

| Ex. No. | Water (%) | Glycols[1] (%) | Surfactant (%) | Weight Loss (%) | Writing Feel |
|---|---|---|---|---|---|
| 1 | 23 | 38 (GL) | 11 | 10 | A |
| 2 | 38 | 31 (GL) | 5 | 23 | B |
| 3 | 37 | 27 (GL) | 4 | 28 | B |
| 4 | 36 | 28 (DEG) | 4 | 24 | B |
| 5 | 36 | 28 (DEG) | 4 | 24 | B |
| 6 | 36 | 28 (PG) | 4 | 21 | B |
| 7 | 36 | 28 (GL) | 4 | 24 | B |
| 8 | 27 | 37 (GL) | 4 | 17 | B |
| 9 | 31 | 30 (GL) | 6 | 21 | B |
| 10 | 29 | 34 (GL) | 4 | 19 | B |
| 11 | 29 | 34 (GL) | 1 | 21 | B |
| 12 | 36 | 29 (GL) | 4 | 25 | B |
| 13 | 36 | 31 (GL) | 4 | 27 | B |
| 14 | 0 | 22 (GL) | 48 | 0 | A |
| 15 | 29 | 0 | 42 | 20 | A |
| 16 | 33 | 27 (GL) | 8 | 24 | A |
| 1* | 53 | 9 (GL) | 0 | 42 | B |
| 2* | 31 | 38 (GL) | 0 | 21 | C |

[1]GL: glycerin; DEG: diethylene glycol; PG: propylene glycol
*Comparative Example In this respect, the weight loss and writing feel of each solid painting material were determined by the following methods, respectively.

Weight Loss

Each solid painting material in the exposed condition was allowed to stand in a chamber maintained at a temperature ranging from 18° to 23° C. and a humidity ranging from 30 to 40% for one day and then the decrease in the weight thereof was determined.

Writing Feel

Letters were written with each solid painting material and this quality was evaluated on the basis of the following criteria:

A: The painting material interested has relatively high resistance to writing operation;

B: The painting material interested has relatively low resistance to writing operations;

C: The painting material interested has relatively low resistance to writing operation, but generates a large amount of waste thereof during writing operations.

What is claimed is:

1. A solid painting material comprising an aliphatic carboxylic acid salt having 8 to 36 carbon atoms as a gel-forming substance, 1 to 40% by weight of a coloring agent, a nonionic surfactant, silica and 0 to 40% by weight of water.

2. The solid painting material of claim 1 wherein a content of the aliphatic carboxylic acid salt ranges from 5 to 30% by weight and that of the nonionic surfactant ranges from 0.5 to 50% by weight, on the basis of the total weight of the painting material.

3. The solid painting material of claim 1 wherein it comprises, on the basis of the total weight of the material, 5 to 30% by weight of the aliphatic carboxylic acid salt, 1 to 40% by weight of the coloring agent, 22 to 50% by weight of the nonionic surfactant and 20 to 38% by weight of water.

4. The solid painting material of claim 1 wherein it comprises a preservative.

5. The solid painting material of claim 1 wherein the nonionic surfactant has an HLB value ranging from 6 to 18.

6. The solid painting material of claim 1 wherein the nonionic surfactant is a member selected from the group consisting of polyoxyethylene alkyl ethers, polyoxyethylene alkylphenyl ethers, polyoxyethylene polypropylene glycols, polyoxyethylene hardened castor oil and sorbitan monoalkyl esters.

7. The solid painting material of claim 1 wherein it comprises a glycolic solvent having 2 to 6 carbon atoms.

8. The solid painting material of claim 7 wherein it comprises, on the basis of the total weight of the material, 5 to 30% by weight of the aliphatic carboxylic acid salt, 1 to 40% by weight of the coloring agent, 0.5 to 15% by weight of the nonionic surfactant, 1 to 20% by weight of silica, 20 to 40% by weight of the glycolic solvent having 2 to 6 carbon atoms and 20 to 38% by weight of water.

9. The solid painting material of claim 1 wherein it is substantially free of water.

10. The solid painting material of claim 9 wherein it comprises, on the basis of the total weight of the material, 5 to 30% by weight of the aliphatic carboxylic acid salt, 1 to 40% by weight of the coloring agent, 25 to 40% by weight of the nonionic surfactant and 20 to 40% by weight of a glycolic solvent having 2 to 6 carbon atoms.

11. The solid painting material of claim 1 wherein the gel-forming substance is an aliphatic carboxylic acid salt having 12 to 18 carbon atoms.

12. The solid painting material of claim 1 wherein the aliphatic carboxylic acid salt is a member selected from the group consisting of sodium myristate, sodium palmitate, sodium stearate and mixture thereof.

13. The solid painting material of claim 1 wherein a content of coloring agent ranges from 2 to 10% by weight on the basis of the total weight of the painting material.

14. The solid painting material of claim 1 wherein a content of silica ranges from 1 to 20% by weight on the basis of the total weight of the painting material.

15. A solid painting material comprising an aliphatic carboxylic acid salt having 8 to 36 carbon atoms as a gel-forming substance, 1 to 40% by weight of a coloring agent, a nonionic surfactant, glycolic solvent having 2 to 6 carbon atoms and 0 to 40% by weight of water.

16. The solid painting material of claim 15 wherein it comprises, on the basis of the total weight of the material, 5 to 30% by weight of the aliphatic carboxylic acid salt, 1 to 40% by weight of the coloring agent, 0.5 to 15% by weight of the nonionic surfactant, 20 to 40% by weight of the glycolic solvent having 2 to 6 carbon atoms and 20 to 38% by weight of water.

17. The solid painting material of claim 15 wherein it comprises, on the basis of the total weight of the material, 5 to 30% by weight of the aliphatic carboxylic acid salt, 1 to 40% by weight of the coloring agent, 25 to 40% by weight of the nonionic surfactant and 20 to 40% by weight of the glycolic solvent having 2 to 6 carbon atoms.

* * * * *